July 1, 1941.  B. S. AIKMAN  2,247,429
LOCOMOTIVE BOOSTER
Filed Oct. 31, 1939  4 Sheets-Sheet 2

INVENTOR
BURTON S. AIKMAN
BY
ATTORNEY

Patented July 1, 1941

2,247,429

UNITED STATES PATENT OFFICE 2,247,429

LOCOMOTIVE BOOSTER

Burton S. Aikman, Wilkinsburg, Pa., assignor to The Westinghouse Air Brake Company, Wilmerding, Pa., a corporation of Pennsylvania Application October 31, 1939, Serial No. 302,155

18 Claims. (Cl. 105—73)

This invention relates to locomotives such as are employed on railroads and more particularly to means for increasing the tractive effort or ability thereof to start and move a train.

Locomotives for railroads are usually provided with an excess of power for turning the driver wheels so that the tractive effort or power of a locomotive for starting and hauling a train is limited principally by the degree of adhesion or static friction existing between the driver wheels and rails rather than by a lack of available power. As a consequence, in attempting to start a train or in hauling it at a low speed where a relatively great amount of power is required, slipping or spinning of the driver wheels often occurs. The possibility of such slipping or spinning may be minimized however by the engineer by cautious application of power to the driver wheels, but this results in a corresponding increase in the difficulty of starting the train, as will be evident.

Spinning or slipping of the driver wheels of a locomotive, particularly in attempting to start a train, is undesirable since it results in a substantially instantaneous reduction in the tractive effort of the locomotive and a corresponding increase in the difficulty of moving the train. Excessive wear of the wheels and rails also occurs and this too is objectionable.

Most modern railway locomotives are provided with trailer wheels for carrying a portion of the weight of the locomotive. In steam locomotives such trailer wheels are often disposed to the rear of the driver wheels under the fire box and on the average carry about one-third as much of the locomotive weight as is carried by the driver wheels. The tractive effort of such a locomotive can be increased by applying power to the trailer wheels so as to take advantage of the traction thereof on the rails.

If, for instance, the trailer wheels of a locomotive carry one-third as much weight as carried by the driver wheels then it is possible to increase the tractive effort of the locomotive by one-third by utilizing such trailer wheels in addition to the usual driving wheels for starting a train. Further, the use of the trailer wheels in addition to the driver wheels for starting a train will provide a given tractive effort with substantially one-third less traction between the wheels and rails than required if the driver wheels only were available for starting the train. The use of the trailer wheels as boosters for starting a train therefore not only make it possible to increase the tractive effort on the locomotive for starting a train, but will also materially reduce the possibility of slipping and spinning of the driver wheels, as will be apparent.

The advantages of using the trailer wheels for augmenting the tractive effort of locomotives has heretofore been recognized and put to use by the provision of boosters for applying power to the trailer wheels. The boosters at present employed are in the form of auxiliary steam engines, as applied to steam locomotives, connected to the trailer wheels and arranged to be operated by steam from the locomotive boiler. Means are provided whereby the engineer may cut the booster engines into and out of operation.

The booster engines at present employed are relatively large and heavy and occupy a considerable amount of space and special arrangements are required for carrying same. Moreover the use of these boosters increases the steam consumption of locomotives since they are operated by steam taken directly from the locomotive boilers. However, these boosters do accomplish the purpose intended of providing greater tractive effort, but as will be apparent, unless caution is still used by the engineer in applying power to the driver wheels of the locomotive spinning thereof is just as likely to occur as before such boosters were used.

One object of the present invention is to provide an improved power booster for a railway locomotive.

Another object of the invention is to provide improved means for increasing the tractive effort of a locomotive and for reducing the possibility of slipping or spinning of the locomotive driver wheels.

Another object of the invention is to provide improved means for increasing the tractive effort of a locomotive with no increase in power consumption of the locomotive.

Another object of the invention is to provide an improved booster for a locomotive which is relatively small in size and simple in construction and which does not require special arrangements for installation but which may be installed in the space usually existing around the axles between the trailer wheels and between one set of the usual driver wheels.

These objects are attained by connecting the trailer wheels of a locomotive for operation from and with one set of the locomotive driver wheels, thereby dividing the power already existing on the locomotive for operating the driver wheels, between said driver and trailer wheels. By this arrangement a certain tractive effort is obtainable with a lower degree of traction between the wheels and rail than if the driver wheels only were effective. The arrangement also provides for obtaining a greater tractive effort for a certain traction between wheels and rails than is obtainable from the driver wheels only. Still further, by connecting the trailer wheels for operation from and with the driver wheels the traction of the trailer wheels will act to oppose slipping or spinning of the driver wheels, as will be apparent.

More specifically, the invention consists in the provision of a hydraulic power unit on the axle of one set of the driver wheels of the locomotive and a hydraulic motor unit on the axle of the trailer wheels, the liquid displaced by the power unit being arranged to operate the motor unit. Since all of the driver wheels of the locomotive are connected through the usual side rods for operation in unison, it will be evident that the hydraulic drive for the trailer wheels divides the power for operating the driver wheels with the trailer wheels for accomplishing the improved results above enumerated.

It will be evident that the improved booster provides, in effect, the equivalent of an additional set of driver wheels on the locomotive without, however, any lengthening of the locomotive wheel base or involving other complications incident thereto. In the case of an additional set of driver wheels on a locomotive they would be connected directly by additional side rods to and for operation in unison with the other driver wheels on the locomotive. In the present instance, however, the hydraulic drive for the trailer wheels acts in the same capacity as the additional side rods just mentioned, but in addition automatically compensates for the difference in diameters of the driver wheels and trailer wheels.

The mean effective steam pressure obtained in the cylinders of steam locomotives is relatively high at the time of starting a locomotive and reduces as the speed of the locomotive increases until at a certain speed, such as twenty-five miles per hour, it is reduced to a degree which is insufficient, usually, to cause slipping or spinning of the driver wheels. No advantage can thus be obtained above this speed from applying power to trailer wheels of the locomotive.

Another object of the invention is therefore to provide means which are operative automatically to cut the improved booster out of operation and into operation above and below, respectively, a certain locomotive speed such as above mentioned.

By this arrangement the improved booster will be automatically cut into operation whenever any benefit can be derived therefrom and will be automatically cut out of operation at all other times, thereby assuring maximum tractive effort of the locomotive at all times with no attention on the part of the engineer. This automatic control also prevents unnecessary wear of the various parts of the booster, as will be apparent.

Other objects and advantages will be apparent from the following more detailed description of the invention.

In the accompanying drawings.

Description

Figures 1, 2, 6:
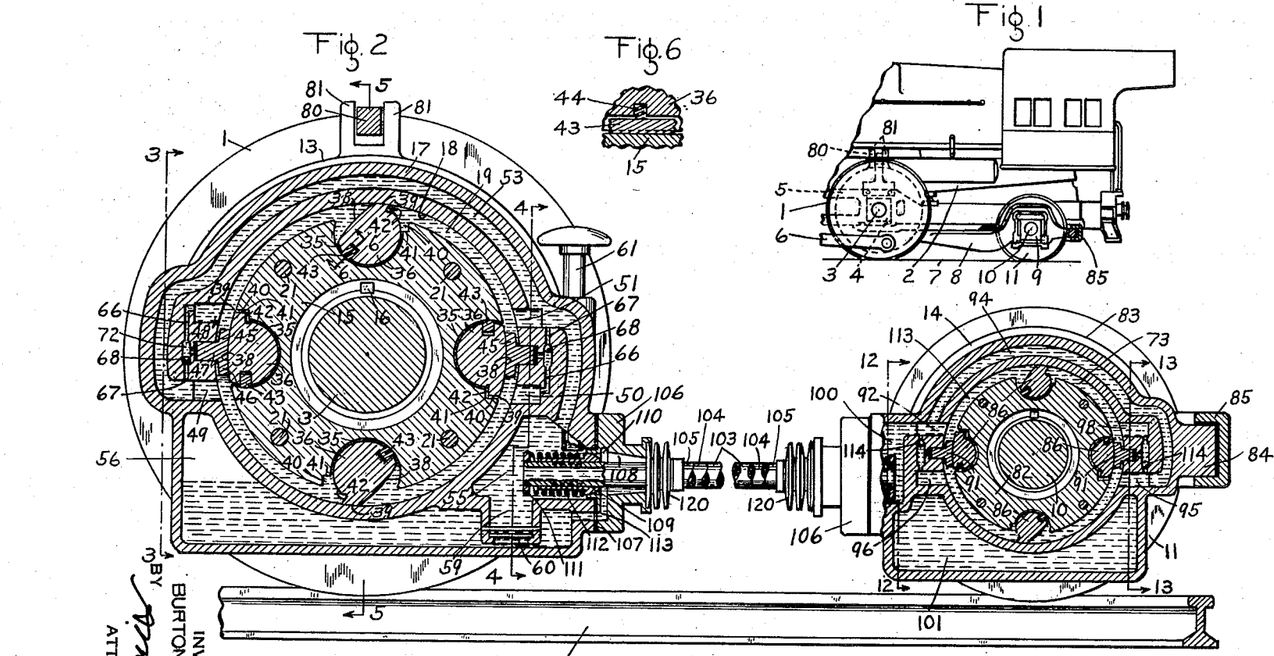
Fig. 1 is a side elevational view of a rear end portion of a conventional type of steam locomotive.
Fig. 2 is a vertical, sectional view taken longitudinally of the portion of the locomotive shown in Fig. 1 and at one side of the transverse center thereof.
Figs. 3 to 6 are sectional views taken on the lines 3—3, 4—4, 5—5, and 6—6, respectively, in Fig. 2.
Figure 3:
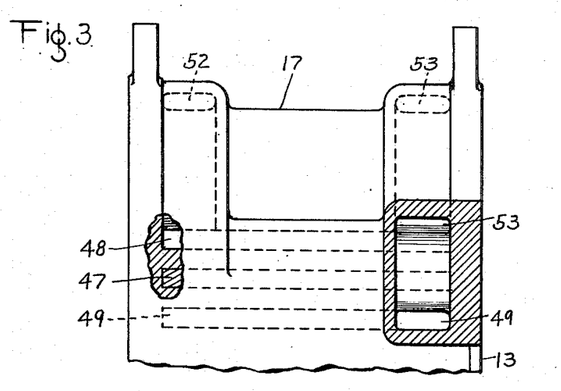

In Figs. 1 and 2 of the drawings the reference numeral 1 indicates the rear driver wheels of a steam locomotive of conventional type. These wheels are disposed in front of the locomotive fire box 2 and are mounted on an axle 3 in the usual spaced relation. At each side of the locomotive the axle 3 is journaled in a journal box 4 mounted in the locomotive under frame 5. The usual side rod 6 is connected to the driver wheel 1 at each side of the locomotive for transmitting power from the steam cylinder (not shown) located on the same side for turning said wheel and for thereby causing the locomotive to operate to move itself and haul a train along track rails 7, in the usual manner.

To the rear of the driver wheels 1 and under the fire box 2 is a trailer truck comprising a frame 8 which is connected at its forward end to the locomotive under frame 5. The rear end of the trailer truck frame 8 is mounted at either side of the locomotive on a journal box 9 carried on an axle 10. Trailer wheels 11 are secured to the axle 10 in any desired manner for rotation therewith, said wheels being arranged to roll on the rails 7.

The trailer truck is arranged in any conventional manner (not shown) to support a portion of the weight of the locomotive, such as one third of the total weight supported on the locomotive driver wheels including the wheels 1, and is provided with any suitable connection with the locomotive under frame 5 through which power applied to the trailer wheels 8 in a manner to be hereinafter described will act to aid the driver wheels to move the locomotive. These constructional characteristics of steam locomotives are so well known that a more complete showing and description thereof would merely involve complications which are not essential to a comprehensive understanding of the present invention.

According to the invention there is provided on axle 3, preferably between the driver wheels 1, a hydraulic power unit or pump 13, while on the trailer axle 10, preferably between the trailer wheels 11, there is provided a similarly constructed but smaller hydraulic motor unit 14. Both of these hydraulic units are of a positive displacement type, that is, operation of the power unit 13 below a certain engine speed, such as twenty-five miles per hour, is adapted to effect a positive flow of hydraulic fluid at high pressure to the motor unit 14 located between the trailer wheels 11. This supply of hydraulic fluid under pressure to the motor unit 14 is adapted to effect positive operation of said unit to rotate the trailer wheels 11 and to thereby aid the locomotive driver wheels to start and haul a train. The hydraulic connection between the driver and trailer wheels thus constitutes a positive but flexible drive for the trailer wheels, all of which however will be brought out in greater detail hereinafter.

The hydraulic power unit 13 comprises a cylindrical rotor 15 encircling and mounted on an enlarged part of the axle 3 midway between the wheels 1. The rotor 15 is secured to turn with axle 3 in any desired manner as by a key 16. A housing 17 encircles the rotor 15 and is provided with a cylindrical bore of greater diameter than rotor 15. This bore has a cylindrical wall 18 arranged in concentric relation with the rotor 15 and providing an annular chamber 19 between said wall and rotor.

Figure 5:
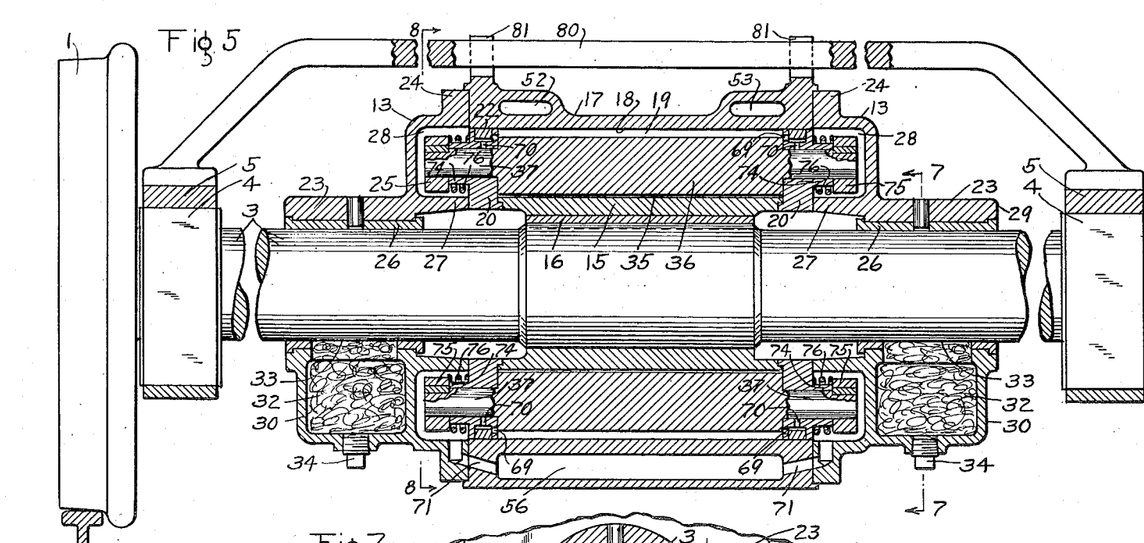
Figures 8, 9, 10, 11, 14:
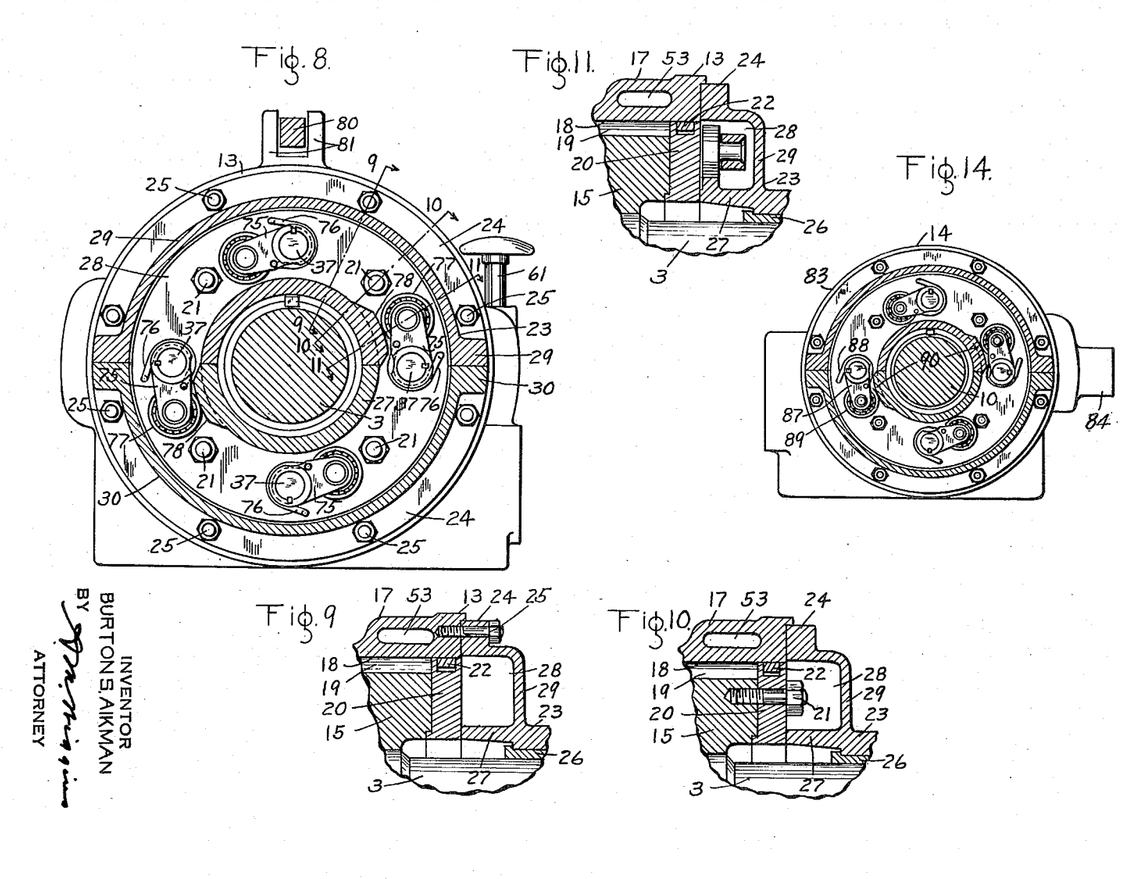
Figs. 9 to 11 are sectional views taken on the lines 9—9, 10—10 and 11—11, respectively, in Fig. 8.
Fig. 14 is a sectional view similar to Fig. 8 of a motor device shown in Fig. 2.

At each end of the rotor there is provided a ring-like end plate 20 encircling the axle 3 and secured to the end of the rotor by screws 21 as shown in Fig. 10. The bore in casing 17 is of such length that both end plates 20 are disposed within but at opposite ends of the chamber 19, as shown in Fig. 5. Each end plate 20 is provided around its outer periphery with an annular groove in which there is disposed an expansible packing ring 22 bearing against the cylinder wall 18. The end plates 20 constitute end walls for the chamber 19. The joint between each of the end plates 20 and the rotor 15 is leak-proof and the packing ring 22 in the outer periphery of each end plate provides a leak-proof running fit with the cylinder wall 18.

Each end of the housing 17 is connected for support to an end bell 23 having an annular flange 24 connected by screws 25 to said housing beyond the outer perimeter of the end plate 20, as shown particularly in Fig. 9 of the drawings. Each end bell has a central bearing portion lined with a bearing 26 which is journalled on the axle 3 beyond the end of the rotor 15. Between the bearing 26 and flange 24 each end bell 23 is provided with an annular rib 27 which bears against the face of the adjacent end plate 20, the ribs 27 of the two end bells thus serving to hold the housing 17 central with respect to rotor 15. An annular chamber 28 is provided in each end bell 23 between the flange 24 and rib 27. Each of the chambers 28 is of substantially the same radial width as chamber 19 and in axial alignment therewith, for reasons which will be later brought out.

Figure 7:
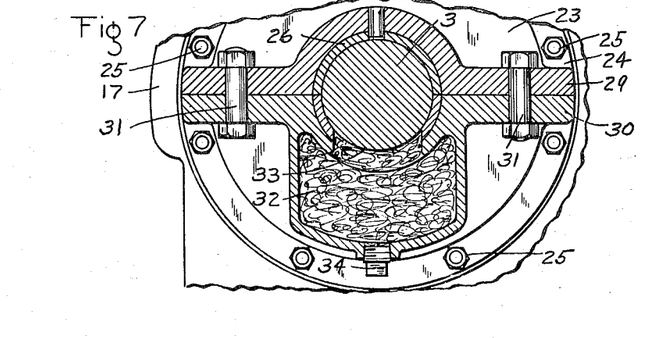
Figs. 7 and 8 are sectional views taken, respectively, on the lines 7—7 and 8—8 in Fig. 5.

Each of the end bells 23 and the bearings 26 therein are made in upper and lower complementary sections 29 and 30 rigidly bolted to each other around the axle 3 by bolts 31, as shown in Fig. 7. This construction is preferred in order that, with the apparatus mounted on a locomotive, the end bells 23 may be removed from around the axle 3 whenever a replacement is necessary of certain working parts of the apparatus to be later described.

In the lower portion 30 of each end bell 23 there is provided a cavity 32 packed with lubricant carrying material such as wool waste. The top of this cavity is open by way of a slot 33 in the lower half of bearing 26 to the journal on axle 3 so that lubricant may travel by capillary action from the waste to said journal for lubricating same. The cavity 32 in each end bell is provided at its lowermost portion with a drain opening which is normally closed by a plug 34.

The rotor 15 is provided with four slots 35 extending lengthwise thereof and spaced equidistant from each other around the rotor. The inner portion of each of the slots 35, that is, the portion closest to the axis of rotor 15, is semi-circular in shape being formed from a center spaced inwardly slightly from the peripheral surface of the rotor. A fluid compressing blade 36 is disposed to rock in each of the slots 35 and is provided at each of its opposite ends with a shaft 37 which extends through suitable bearings, provided in the adjacent end plate 20, into the chamber 28 outside of said end plate. These shafts 37 and the bearings therefore in the end plates 20 are arranged in coaxial relation with the semi-circular portions of the slots 35. The fit between each of the shafts 37 and its bearing is preferably a neat running fit in order that each of the blades 36 will be rigidly supported to rock in its respective slot 35 and also to minimize leakage of liquid under pressure from chamber 19 at one side of the end plate 20 to chamber 28 at the opposite side. A like fit is provided between the ends of the blades 36 and the end plates 20 to minimize leakage of liquid under pressure past said ends from one side of the blades to the opposite side.

Each of the blades 36 is provided with a face 38 sufficiently close to the axis of the blade and so formed as to line up with the opposite edges of the respective slot 35 and the contour of rotor 15 in a non-working position of the blade, in which position the two blades 36 are shown at the opposite sides of the rotor 15 in Fig. 2 of the drawings. Adjacent one edge of the face 38 of each blade 36 there is provided a bearing surface 39 adapted in another or working position of the blade to bear against the cylinder wall 18 for closing communication between the spaces thus formed at the opposite sides of the blade; the blades at the top and bottom of the rotor 15 in Fig. 2 of the drawings being shown in this working position.

At one side of each slot 35 the rotor 15 is cut away to provide a cavity 40 to receive the portion of the blade 36 on which the surface 39 is formed and also to provide a shoulder 41 for engagement by a shoulder 42 on the blade for defining the non-working position of the blade. Each of the blades 36 is provided with a slot substantially opposite the bearing face 39 and extending longitudinally of the blade and in this slot there is slidably mounted a packing strip 43. Back of the packing strip 43 in each blade there is provided one or more springs 44 (Fig. 6) for urging the strip outwardly into sealing contact with the semi-circular surface of slot 35. These packing strips 43 are provided for preventing leakage of liquid under pressure through the slots 35 from one side of the blades 36 to the opposite side thereof.

It will be noted that when the blades 36 are in their working position with the surfaces 39 engaging the cylinder wall 18, pressure applied to either side of the blades will act at both sides of the axis of the blades with a substantially equal degree of force so that there will be substantially no tendency of such pressure to turn the blades in either one direction or the other.

A pair of dividing walls 45 are located diametrically opposite each other at opposite sides of the rotor 15. Each of these walls 45 comprises a shoe 46 contoured to fit and bear against the cylindrical surface of rotor 15 and surface 38 on the blades 36 from one end plate 20 to the other, and a tongue or guide portion 47 carrying the shoe 46 and slidably mounted in a slot provided in the casing 17 lengthwise thereof between the end plates 20. The fit between each of the dividing walls and the rotor or surfaces 38 on the blades 36 and with the housing 17 and end plates 20 is such as to minimize leakage of fluid from one side of the wall to the other.

At one side of the housing 17, as viewed in Fig. 2, there are provided two openings 48 and 49 to chamber 19, the opening 48 being arranged immediately above one dividing wall 45 while the opening 49 is arranged immediately below said wall. Like, but oppositely arranged openings 50 and 51 to chamber 19 are provided in diametrically opposite portions of housing 17 at opposite sides of the other dividing wall 45. The openings 48 and 50 are in permanent communication with each other by way of a passage 52 extending through the housing over the rotor 15, while the openings 49 and 51 are in permanent communication through a similar passage 53.

The passages 52 and 53 extend past the respective openings 51 and 50 in a downwardly direction and terminate in chambers 54 and 55, respectively. The chambers 54 and 55 are preferably formed at opposite ends of the housing 17 and between said chambers there is provided a sump 56.

The housing 17 is provided with a passage 57 through which communication is adapted to be established in the direction from sump 56 to chamber 54 and in said passage there is arranged a check valve 58 for closing communication in the opposite direction. The housing 17 is also provided with a passage 59 connecting sump 56 to chamber 55 and in said passage there is provided a check valve 60 for closing communication in the direction of said sump.

The sump 56 is provided for carrying a reserve of liquid, such as oil, for the operation of the locomotive booster. A filler pipe 61 secured in the housing 17 and extending from the exterior thereof to the sump 56 is provided for filling said sump with liquid.

The chamber 54 is also connected to the sump 56 by way of a pressure limiting or relief valve 62. A spring 63 acts on the relief valve 62 with a predetermined force for normally holding said valve seated. A like arrangement of relief valve 64 and spring 65 is arranged to control a communication between chamber 55 and the sump 56. The relief valve 62 and spring 63 are provided for limiting the pressure of liquid pumped by the power unit 13 and for spilling over to the sump 56 all liquid displaced by said unit in excess of the displacement of the motor unit 14 when the rotor 15 is turned in one direction while the other relief valve 64 and spring 65 are adapted to act in a like capacity upon rotation of rotor 15 in the opposite direction. The connected openings 48 and 50, and 49 and 51, above described are, as will be evident, arranged in pairs at opposite sides of rotor 15 and either pair is adapted to act as either intake or discharge openings for the power unit 14, according to the direction of rotation of the rotor 15, as will be hereinafter more fully brought out.

The space at the end of the tongue 47 of each dividing wall 45 is open to a chamber 72. One end of each chamber 72 is connected to a passage 66 which at one side of the housing leads to the opening 48 while the other end of said chamber is connected to a passage 67 leading to the opening 49. At the opposite side of the housing the passages 66 and 67 are connected respectively to the openings 50 and 51. In each of the chambers 72 there is provided a check valve 68 for closing communication between chamber 72 and either one or the other of the passages 66 and 67, as will be later described.

Each of the end plates 20 is provided with a port 69 through which liquid may pass from the chamber 19 to the space at the inner periphery of packing ring 22; said space in each end plate being also open through port 70 to the bearings of the several shafts 37 therein. By this arrangement liquid at the pressure pumped by the power unit 13 is adapted to be applied to the inner peripheral faces of the packing rings 22 for forcing same outwardly into sealing contact with the cylinder wall 18 and also to the shafts 37 for lubricating same. Any lubricant which may leak past the shafts 37 to the chambers 28 is adapted to flow to the bottom of said chamber and then through ports 71 to the sump 56.

The bearing in the end plates 20 for each of the shafts 37 includes a sleeve-like extension 74 of the end plate projecting into the chamber 28. Beyond the extensions 74 an arm 75 is keyed to each shaft 37. A torque spring 76 encircling each of the extensions 74 has one end secured to the end member 20 and the other end is secured to the arm 75. The two torque springs 76 acting on the arms 75 at the opposite ends of each of the blades 36 are so arranged as to operate the shafts 37 to turn the blade to its working or pumping position, that is, in such a direction as to move the surface 39 on the blade into contact with the cylinder wall 18.

At the outer end of each of the arms 75 there is provided a roller 77. In each of the chambers 28 there is provided in operating alignment with the several rollers 77 therein a pair of like stationary cams 78 which are formed diametrically opposite each other on the outer periphery of the rib 27 extending from the end bell 23.

The cams 78 are provided for moving the rollers 77 outwardly against the force of the torque springs 76 and this movement of said rollers is adapted to operate the arms 75 to turn the blades 36 from their working position to the non-working position in which the surface 38 of the blades lie within the contour of the rotor 15. The valleys between the cams 78 are of such depth as not to be engaged by the rollers 77 when the blades 36 are in their working position thereby permitting the torque springs 76 to urge the bearing surfaces 39 of the blades 36 into contact with the cylinder wall 18.

The cams 78 are so arranged with respect to the dividing walls 45 that upon rotation of rotor 15 within the housing 17 said cams will operate the rollers 75 and thereby the arms, to turn the blades 36 from their working position to their non-working position within the contour of the rotor just prior to the blades reaching said dividing walls. The cams 78 thus condition the blades 36 to pass beneath the dividing walls following which the torque springs 76 promptly return said blades to their working position. This operation occurs upon rotation of the rotor 15 in either direction within the casing 17. In the non-working position of each blade 36 the surface 38 acts to fill in the space between the opposite sides of the slot 35 so as to cooperate with the dividing walls 45 at this time to close communication between the parts of chamber 19 at the opposite sides of said walls.

It will be noted that during rotation of rotor 15 the torque springs 76 will oppose the action of centrifugal force on rollers 77 and arms 75 and these springs are so designed as to exceed said action of centrifugal force for all speeds of rotation of the driver wheel 1 and rotor 15 below a certain chosen degree, such as twenty-five miles per hour. When the speed of rotation of rotor 15 exceeds the chosen degree then the action of centrifugal force on the rollers 77 and arms 75, which function as centrifuges, is adapted to exceed the force of the torque springs 76, in which case the blades 36 will be maintained within the contour of the rotor 15 in engagement with the shoulders 41.

The housing 17 is held against rotation by a bar 80 extending transversely of the locomotive over the housing and secured at its opposite ends to the locomotive under frame 5, said bar extending between and cooperating with a pair of upwardly extending lugs 81 provided at both ends of the housing 17 for accomplishing this result.

The motor unit 14 is of smaller size and has a less displacement than the power unit 13 and is of the same construction as said power unit except that in said motor unit there are no relief valves and springs such as the parts 62 to 65 in the power unit 13, and there are no passages or check valves such as 57 to 60 in the motor unit. For these reasons the following description of the motor unit 14 will be brief.

The motor unit 14 comprises a rotor 82 disposed between the trailer wheels 11 on the axle 10 and keyed to said axle for rotation therewith. A housing 83 is provided around the rotor 82 and is supported at opposite ends on the trailer axle 10 in the same manner as housing 23 of the motor unit is carried by axle 3. The housing 83 is provided at one side of the trailer axle 10 with an outwardly extending nose piece 84 which is disposed between the side walls of a channel shaped end piece 85 of the trailer frame 8 for holding said housing against rotation.

The housing 83 is supported from the axle 10 in concentric relation with the rotor 82 and is provided interiorly with a cylinder wall 73 of greater diameter than that of the rotor and in concentric relation therewith providing an annular chamber 113 between said motor and casing. The rotor 82 carries four operating blades 86 equally spaced from each other around the rotor, and for controlling said blades there are provided at both ends of the housing arms 87, torque springs 88, rollers 89 and cams 90. Dividing walls 91 are provided in the housing for cooperating with the rotor and blades to separate the space between the housing and rotor above the blades from that below the blades.

The housing 83 is provided above the dividing wall 91, shown at the left hand side of the device in Fig. 2, with an opening 92 connecting the space between the rotor and housing to a passage 94 which extends around the housing to an opening 95 leading into the space between the rotor and housing below the opposite dividing wall 91. An opening 96 is provided through the housing to the space between the rotor and housing below the dividing wall 91, at the left hand side of the power unit shown in Fig. 2, and this opening is connected to a passage 97, which extends around the housing to an opening 98 leading to said space above the dividing wall 91 at the opposite side of the rotor.

At the left hand side of the motor unit 14, as viewed in Fig. 2 of the drawings, the passage 97 is connected to a chamber 99 while the passage 94 is connected to a chamber 100. Intermediate the chambers 99 and 100 there is provided a chamber 101 which is connected at opposite ends through ducts 102 to the opposite ends of housing 83 whereby liquid which may leak past the ends of the blades 86 may return by gravity to said chamber in the same manner as in the power unit 13.

Figure 4:
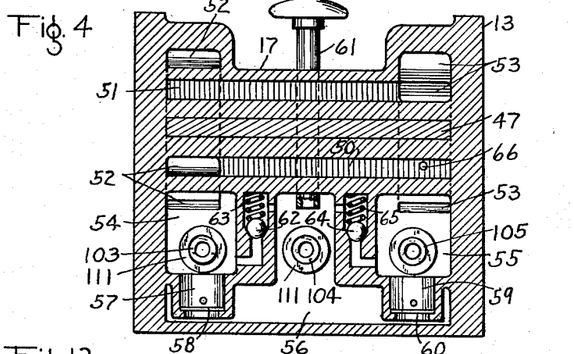

From the above description of the motor unit 14 it will now be apparent that, except for size, the various parts thereof are of the same construction as those employed in the power unit 13 and it will also be apparent that their operation will be the same. As above pointed out, however, there are no communications in the motor unit between the chambers 99 and 100 and the chamber 101 by way of check valves or relief valves as provided in the power unit 13 and as shown in Fig. 4 of the drawings.

The chambers 54, 56 and 55 in the power unit 13 are connected to the chambers 99, 101 and 100 in the motor unit 14 by way of pipes 103, 104 and 105, respectively. These pipes are preferably rigid but connections are provided between the pipes and the power and motor units which are flexible to provide for limited universal movement between the pipes and the respective units and thereby between said units.

All of these pipe connections are the same in construction as shown in Fig. 2 connecting the pipe 105 to the power unit 13 and only this one connection will therefore be described. This connection comprises a cap 106 rigidly secured to the unit 13 with a gasket 107 interposed between to avoid leakage of liquid at the joint. The cap 106 is provided centrally with an opening 108 which leads to the chamber 55 within the unit and through this opening the pipe 105 extends into said chamber. This opening is of larger diameter than the pipe and is provided at its inner end with a conical seat 109 which is engaged by a similarly shaped surface provided on a seat member 110. The member 110 has a sliding fit over the pipe 105 in order to minimize leakage from chamber 55 to the opening 108 and interposed between said seat member and a nut 111 provided on the end of the pipe is a spring 112 for urging the seat member 110 into sealing contact with the seat 109.

The opening 108 in the cap 106 is connected by way of a passage 113 to the sump 56 in the power unit so that any leakage which may occur from chamber 55 past the seat member 110, either by way of its bearing against the seat 109 or its connection with the pipe, may drain back to the sump. A flexible boot 120 is provided around each of the pipes 103, 104 and 105 outside of the cap 106 with one end secured to the pipe and the other to the cap to prevent foreign matter entering the opening 108 within said cap.

As will be apparent, the seat member 110 is adapted to rock on seat 109 to provide for a certain limited universal movement of the pipe 105 with respect to the cap 106 and with such a connection at both ends of pipes 103, 104 and 105, the power unit 13 and motor unit 14 are free to move with the axles 3 and 10 relative to each other transversely of the locomotive. These connections also provide for slight rotational movement of the power and motor units relative to each other. The springs 112 provide for lengthening, in effect, of the pipe connections between the power and motor units, so that said units are free to move with the axles 3 and 10 upon slight relative movement between said axles longitudinally of the locomotive.

Operation

With the power and motor units 13 and 14 both in condition for operation the chambers 19 and 113 in the two units, the openings in the housings connected to said chambers, the passages connecting said openings, and the pipes 103 and 105 connecting said units together will all be completely filled with any desired liquid, such as oil, as shown in Fig. 2 of the drawings.

Figure 12:
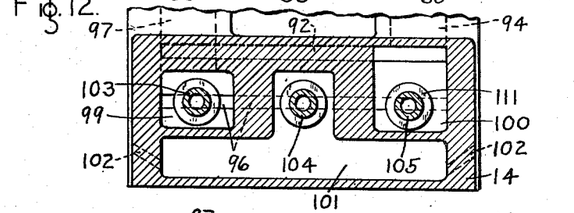
Figs. 12 and 13 are sectional views taken, respectively, on the lines 12—12 and 13—13 in Fig. 2.
Figure 13:
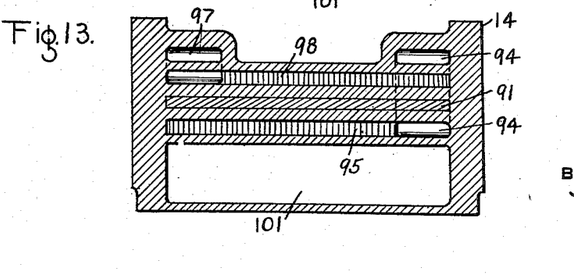

The chamber 101 in the motor unit 14 will initially be void of liquid, but as leakage occurs through said unit to said chamber it will gradually fill up to pipe 104 (see Fig. 12) and then oil will flow by gravity from said chamber to sump 56 in the power unit 13. The sump 56 will be more or less filled with liquid by way of the filler pipe 61, the supply of liquid in this chamber being provided to offset any possible loss of liquid in the apparatus. This loss, however, is reduced to a very minimum, as will be apparent, since all leakage in both the power and motor units is returned to the sump 56. The only purpose of the pipe 104 is to return the liquid from the sump 101 in the motor unit to the sump 56 in the power unit.

With the system completely filled with liquid as above described, when power is applied to turn the locomotive driver wheels including the wheels 1, such power also acts through the axle 3 to turn the rotor 15, the direction of rotation of said rotor being dependent upon the direction of movement of the locomotive.

Assume that power is applied to the driver wheels 1 for moving the locomotive in a forward direction, as viewed in Figs. 1 and 2 of the drawings. Under this condition the driver wheels 1 and thereby the rotor 15 will turn in a counter-clockwise direction as well as the trailer wheels 11 and rotor 82 of the motor unit 14.

Upon counter-clockwise rotation of the rotor 15 in the power unit 13 the blades 36 at either side of the dividing walls 45 will act to force the liquid in front of them in the direction of the dividing blades 45 and out through the openings 48 and 50 into passage 52 and thence to chamber 54 connected to one end of the pipe 103. As the blades 36 at either side of the dividing walls 45 are thus operated the space created to the rear of said blades due to their movement is filled with liquid drawn in from chamber 55 and passage 53 and through openings 51 and 49.

Before one pair of oppositely disposed blades 36 reach the dividing walls 45 upon rotation of the rotor 15 as just described, the other pair of oppositely disposed blades 36 enter the spaces to the rear of the first named pair and start forcing liquid ahead of them and drawing liquid into the spaces created to the rear of them. This operation of the last named pair of blades is of no consequence however until the blades ahead are turned by the cooperative action of arms 75, rollers 77 and cams 78 out of the way of the dividing walls 45 into the rotor 15 at which time the trailing blades become subject to the pressure of liquid in openings 48 and 50 and then act to force the liquid ahead of them out of said openings into passage 52 and to chamber 54. The oppositely arranged pairs of blades 36 thus act successively upon rotation of rotor 15 to create a substantially continuous discharge of liquid through the openings 48 and 50 to the chamber 54 and a substantially continuous draw of liquid from chamber 55 through openings 51 and 49. For counter-clockwise rotation of rotor 15, the openings 48 and 50 thus constitute discharge openings for the unit while the openings 49 and 51 constitute inlet openings therefore. By arranging the blades to work in oppositely disposed pairs, a balance of forces in the mechanism is obtained, as will be apparent.

Liquid forced into chamber 54 in the power unit 13, as just described, flows therefrom through pipe 103 to chamber 99 in the motor unit 14. From chamber 99 the liquid is supplied to the opening 96 and through passage 97 to the diametrically opposite opening 98 and then flows through said openings to chamber 113 between the rotor and housing. The liquid thus forced into chamber 113 acts on the oppositely disposed pair of blades 86 above and below the dividing walls 91 to turn the rotor 82 and thereby the trailer wheels 11 in the same direction as the rotor 15 and driver wheels 1 are being turned. The liquid ahead of the blades 86 above and below the dividing walls 91 in the motor 14 is displaced by said blades out through the openings 92 and 95 to chamber 100 and thence through pipe 105 back to chamber 55 in the power unit 13 from which chamber liquid is drawn by the operation of blades 36 in the power unit 13. The blades 86 in the motor unit are thus operated by the liquid displaced by the power unit 13 to turn the trailer wheels 11 in the same direction as the driving wheels of the locomotive, and it will be noted that the liquid displaced by the motor unit is fed directly back to the inlet openings of the power unit.

The power applied by the usual steam cylinders on the locomotives to turn the driver wheels including the wheels 1 is thus caused to operate the rotor 15 for effecting rotation thereof to force liquid under pressure to the motor unit 14 on the trailer axle 10 for turning the trailer wheels 11. The power from the usual steam cylinders is thus divided with another set of wheels on the locomotive which, in effect, become drivers for the locomotive thereby taking advantage of the traction between the trailing wheels 11 and rails 7 to obtain a greater tractive effort for the locomotive than is obtainable from the driver wheels only.

In case the driver wheels should tend to slip on rails 7 relative to the trailer wheels 11 the power unit 13 will operate, as a result, to force an excessive amount of liquid to the motor unit 14 but since the spaces in the motor unit are already completely filled with liquid said motor unit will create a back pressure on the power unit 13 opposing such tendency to slip. Likewise in case the trailer wheels 11 should tend to slip relative to the driver wheels 1, the motor 14 will start to act like the power unit 13 to force liquid from ahead of the blades 86 through the pipe 105 to the rear of the blades 36 in the power unit 13. A back pressure will thereby be created on the blades 86 in the motor unit 14 to reduce or counteract a greater or less portion of the actuating power applied to said blades by operation of the power unit 13 and this reduction in power will prevent slipping of the wheels 11 on the rails 7. It will be noted that since all of the driver wheels on the locomotive are connected together by the usual side rods, such as the rods 6 shown in Fig. 1, the combined action of all of said wheels will oppose slipping of the trailer wheels 11 while the reaction of the motor unit 14 on the power unit 13 as above described will tend to counteract or prevent slipping of said driver wheels. The possibility of slipping of the locomotive wheels will, however, be substantially eliminated by the use of the present invention since as great a tractive effort is obtainable by its use from a considerably lower degree of adhesion between the wheels and rail than is required to provide the same tractive effort without the use of the invention.

In case the engine is run backwards the rotor 15 will be turned in a clockwise direction and the flow of liquid displaced thereby to the power unit 13 will be in the direction from chamber 54 to chamber 55, or just the reverse from that with the locomotive running in a forward direction. For this reverse movement the openings 49 and 51 in the power unit 13, become discharge openings, while the openings 48 and 50 become inlet openings for said unit, this condition being just the reverse from that existing with the locomotive running forward.

The liquid forced into the chamber 55 as just described will flow through the pipe 105 to chamber 93 in the motor unit 14 and in said unit will act on the blades 86 above and below the dividing walls 91 to effect rotation of the rotor 82 and thereby of the trailer wheels 11 in a clockwise direction for aiding the driver wheels 1 to drive the locomotive rearwardly. In this case liquid will be discharged by the blades 86 in the motor unit 14 into the chamber 99 and then flow back through pipe 103 to chamber 54 in the power unit 13 for supply to the inlet openings 48 and 50.

It will be noted that the stream of liquid supplied by the power unit 13 to the motor unit 14 and then back to the power unit flows through a closed circuit in one direction when the locomotive runs forward and in the reverse direction when the locomotive runs backward. This closed hydraulic circuit constitutes a positive but flexible drive connection between the driver wheels 1 and trailer wheels 11.

This closed hydraulic circuit must be maintained completely filled with liquid to operate as intended. Slight leakages will however occur from the circuit in both the power and motor units by way of the ends of the blades or at other points. In order to compensate for any loss of liquid in the circuit upon rotation of rotor 15 in a counterclockwise direction the passage 59 is provided to permit liquid to flow from the sump 56 to chamber 55 to insure complete filling of the spaces to the rear of the blade 36 and thus offset such loss. The check valve 60 is provided to close communication through passage 56 and prevent flow of liquid from chamber 55 to the sump 56 when the rotor 15 is turned in a clockwise direction and discharges liquid into chamber 55. The passage 57 is provided for supplying liquid from the sump 56 to chamber 54 to compensate for leakage when the rotor is operated in a clockwise direction, while the check valve 58 is provided to close communication through passage 57 when the chamber 54 becomes the discharge chamber for the power unit 13 upon rotation of the rotor 15 in a counterclockwise direction.

The liquid pressure obtainable by operation of the power unit 13 for operating the motor unit 14 is limited to a desired degree by the pressure of spring 63 on the relief valve 62 when the rotor 15 is turned in a counterclockwise direction and by the pressure of spring 65 on the relief valve 64 when the rotor is turned in the opposite direction. These springs act to hold the relief valves seated whenever the pressure created by the power unit 13 does not exceed a desired degree, but, if for any reason, it does exceed such a degree the pressure is adapted to unseat one or the other of the relief valves, dependent upon the direction of rotation of the rotor 15, and then be relieved by way of past the check valves to sump 56. More specifically, the relief valves 62 and 64 are provided to limit the pressure obtainable by operation of the power unit 13 for operating the motor unit 14, in case the displacement of the power unit exceeds that of the motor unit, as will be more definitely pointed out hereinafter.

The diameter of the trailer wheels 11 on a locomotive is usually relatively small as compared to that of the driver wheels 1, as illustrated in the drawings, and as a result, the trailer wheels will rotate at a faster rate along the rail 7 than the driver wheels 1. Let it be assumed that the trailer wheels 11 will make two revolutions for each revolution of the driving wheel 1. In this case the displacement of the power unit 13 for one revolution must be twice that of the motor unit in order to effect two revolutions of said motor unit.

Any specific relation between the diameters and the speeds of rotation of the driving wheels 1 and the trailer wheels 11 on a locomotive is difficult to obtain and then to maintain in service due to wear of both the driving and trailing wheels, and more particularly to the more rapid wear of the driving wheels due to their being used to a greater extent for propelling a train than are the trailing wheels 11. As a result of this condition, the power unit 13 must have such a capacity that when applied to driver wheels 1 of maximum diameter it will supply an adequate amount of liquid under pressure for operating the motor unit 14 when applied to trailer wheels 11 of a minimum diameter, such as might be obtained after long service.

The power and motor units 13 and 14 might be designed with matched displacements for one particular relation of driven and trailer wheels, but as will be evident, unequal wear of the wheels or the replacement of certain wheels without replacement of the others would destroy this relation. The displacement of the power unit 13 must therefore exceed that of the motor unit 14 sufficiently to meet the worst conditions of wheel relation, and the relief valves 62 and 64 are provided to dissipate any displacement of the power unit 13 which is in excess of that of the motor unit 14 so that the liquid obtained at the motor unit is only sufficient for effecting operation of the trailer wheels at the same peripheral speed as the driver wheels 1.

The relief valves 62 and 64 thus automatically adjust the power transmitted to the trailer wheels in accordance with the relative diameters of the trailer wheels, or in other words serve as a means to effect automatic adjustment of the drive ratio between the driver and trailer wheels in accordance with their relative diameters.

When the locomotive is moving in a forward direction the pressure of liquid discharged by rotor blades 36 into the openings 48 and 50 is transmitted through the passages 66 to chambers 72 and therein acts to shift the check valves 68 to close communication between the said chambers and the passages 67 which are in communication with the inlet sides of said blades. The pressure of liquid delivered by the power unit 13 is thereby applied to the ends of the tongues 47 of the dividing walls 45 and acts to urge said walls outwardly for sealing contact with the cylindrical surface of rotor 15 and with the surfaces 38 on the blades 36, as said blades pass beneath said walls. The dividing walls 45 thus effectively isolate or separate the portion of chamber 19 above the axis of the rotor from the portion below the axis. In case the rotor 15 is turning in a clockwise direction the check valves 68 are shifted to the positions opposite those above described by the pressure of liquid discharged by the blades 36 to the openings 49 and 51, so as to thereby render said pressure effective on the end of the tongues 47 of the dividing walls 45 to hold said walls in their operating position. In the motor unit 14 communications including check valves 114 are provided for subjecting the dividing walls 91 to the pressure of liquid obtained from the power element 13 through either the pipe 103 or pipe 105 for urging said dividing walls against the rotor 82 in the same manner and for the same purpose as above described in connection with the power unit 13.

The power unit 13 will operate as above described for both directions of movement of the locomotive to supply liquid under pressure to operate the motor unit 14 as long as the speed of the locomotive or speed of rotation of the driver wheels 1 is below a chosen degree. Whenever the speed of rotation of the driver wheels 1 and rotor 15 exceeds this degree the action of centrifugal force on the rollers 77 and arms 75 exceeds the torsional force of the springs 76 and will act to hold the rollers 77 and arms 75 in their outer positions upon movement thereto by cams 78. This operation of the arms 75 will act to hold the rotor blades 36 in their non-working positions within the contour of the rotor for passing the dividing walls 45.

With the rotor blades 36 thus held in their non-working positions there will be no liquid forced by the power unit 13 to the motor unit 14 for effecting operation thereof. As a result, the motor unit 14 will be cut out of operation or rendered ineffective to increase the tractive effort of the locomotive above a certain speed of the locomotive. In case the speed of the locomotive reduces however to a degree at which the force of the springs 76 exceeds that of centrifugal force acting on the arms 75 and rollers 77, then said springs will again act to turn the rotor blades 36 to their working positions for displacing liquid to again effect operation of the motor unit 14, as above described.

Whenever the rotor blades 36 are moved to and held within the contour of the rotor 15, as above described, it will be noted that the rotor then merely turns within the liquid body surrounding it within effecting any displacement of liquid and the only resistance to such turning is that due to the drag of the rotor in said liquid, which, however, is of a very low degree. In this cut out condition there is substantially no pressure on the liquid in the system and the dividing walls 45 are therefore not forced against the rotor 15. As a result, there will be substantially no wear of these operating parts of the mechanism when the booster is cut out of operation above a certain speed of the driver wheels, as above described.

When the power unit 13 is cut out of operation as above described there is no need for the rotor blades 86 in the motor unit 14 to be maintained in operating condition. As a result, the torsion springs 88 in this unit are adapted to yield to the action of centrifugal force at substantially the same time as the springs 76 in the power unit 13 yield to permit the rotor blades 86 to be moved into and to be held within the contour of the rotor 82 in the same manner as before described in connection with the power unit 13. Thus the power unit and motor unit are both adapted to be automatically cut out of operation whenever the speed of the driver wheels 1 exceeds a chosen degree and into operation to increase the tractive effort of the locomotive whenever the speed of the locomotive is below said chosen degree. In use, the motor unit 14 may be cut out of operation ahead of the power unit 13 or said units may be cut out in the reverse order or they may both be cut out at substantially the same time. This is of no consequence, since the operation of either one will cut out the application of power to the trailer wheels 11. When both are cut out, however, there will be substantially no flow of liquid between the units, as will be apparent.

*Summary*

It will now be apparent that the improved locomotive booster provides a positive hydraulic drive for the trailer wheels 11 from the locomotive drive wheels 1. This drive is automatically adjustable to vary the drive ratio between the driver and trailer wheels or, in other words, to compensate for the usual variations in diameters of both driver and trailer wheels which may be encountered in new locomotives or in locomotives after use, so as to thereby provide for obtaining the same peripheral speed of the trailer wheels 11 as of the driver wheels 1. Means are also provided which are automatically operative to cut the booster mechanism into operation below a certain locomotive speed and out of operation above such speed. It will be noted that all these advantages are obtainable without any attention from the engineer of the locomotive.

While one illustrative embodiment of the invention has been described in detail it is not the intention to limit the scope to this embodiment or otherwise than by the terms of the appended claims.

Having now described my invention, what I claim as new and desire to secure by Letters Patent is:

1. An apparatus for increasing the tractive effort of a locomotive having a power operated driver wheel and having a trailer wheel, said apparatus comprising a power producing means operable upon rotation of said driver wheel to effect a positive displacement of liquid in a quantity which varies with the speed of rotation of said driving wheel, motor means associated with said trailer wheel operable by liquid under pressure for driving said trailer wheel, and means connecting said power and motor means operable to convey the liquid displaced by said power means to said motor means for effecting operation of said motor means to drive said trailer wheel.

2. An apparatus for increasing the tractive effort of a locomotive having a power operated driver wheel and having a trailer wheel, said apparatus comprising a motor unit for driving said trailer wheel, a power generating unit connecting to said motor unit and operative by said driver wheel to generate power for operating said motor unit, said motor unit and power unit both being positive, liquid displacement devices, the displacement of said power unit exceeding that of said motor unit, and means for dissipating the liquid displaced by said power unit in excess of that required by said motor unit to operate said trailer wheel at the same peripheral speed as said driver wheel is operated.

3. An apparatus for increasing the tractive effort of a locomotive having a power operated driver wheel and having a trailer wheel, said apparatus comprising a motor unit connected to said trailer wheel for driving same, a power generating unit connected to said motor unit and operative by said driver wheel to generate power for operating said motor unit, said motor unit and power unit both being positive, liquid displacement devices with said power unit having a displacement at least equal to that of said motor unit at the same peripheral speeds of both of said wheels.

4. An apparatus for increasing the tractive effort of a locomotive having a power operated driver wheel and having a trailer wheel, said apparatus comprising a displacement motor connected to said trailer wheel and adapted to be operated by liquid under pressure for driving said trailer wheel, a liquid displacement unit operative by said driver wheel to displace liquid in an amount at least equal to the consumptive capacity of said motor, for the same peripheral speeds of said driver and trailer wheels for operating said motor, and means subject to the pressure of liquid displaced by said unit and operative upon an increase in said pressure to a chosen degree to release displaced liquid for preventing a further increase in said pressure.

5. An apparatus for increasing the tractive effort of a locomotive having a power operated driver wheel and having a trailer wheel, said apparatus comprising a motor adapted to be operative by liquid for driving said trailer wheel, a liquid displacement unit operative by said driver wheel to displace liquid for operating said motor, the displacement of said displacement unit exceeding that of said motor for the same peripheral speeds of said driver and trailer wheels, and means subject to the pressure of liquid displaced by said displacement unit and operative automatically to release the liquid displaced by said displacement unit in excess of the displacement of said motor unit when the peripheral speed of said trailer wheel equals that of said driver wheel.

6. An apparatus for increasing the tractive effort of a locomotive having a power operated driver wheel and having a trailer wheel, said apparatus comprising a power unit having an inlet opening and an outlet opening and operative by said driving wheel to create a positive flow of liquid from said inlet opening to and out of said outlet opening, a motor unit adapted to be operated by liquid supplied to an inlet opening for driving said trailer wheel and adapted upon operation to discharge such liquid to an outlet opening, a pipe connecting the outlet opening of said power unit to the inlet opening of said motor unit, another pipe connecting the outlet opening of said motor unit to the inlet opening of said power unit, a sump containing a quantity of liquid, and means providing a supply communication between the liquid in said sump and the inlet opening of said power unit.

7. An apparatus for increasing the tractive effort of a locomotive having a power operated driver wheel and a trailer wheel, said apparatus comprising a liquid displacement power unit operative by said driver wheel to create a positive flow of liquid in a direction from one opening to and out of another opening upon rotation of said driver wheel in one direction and operative to create a positive flow of liquid in the opposite direction between said openings upon reverse rotation of said driver wheel, a motor unit having two openings and adapted to be operated by the flow of liquid in a direction from one of the two openings to the other to drive said trailer wheel in one direction and upon flow of liquid between the said two openings in the reverse direction to drive said trailer wheel in the reverse direction, and a pair of pipes connecting the openings in the power and motor units in such a manner that the liquid discharged by said power unit will operate said motor unit to turn said trailer wheel in the same direction as the driver wheel is turned, and the liquid discharged from said motor unit will be conveyed to the other opening in said power unit, a sump chamber containing a quantity of liquid connected through two independent communications with the said two openings in said displacement power unit, and a check valve in each of said communications operative to close the communication when the opening to which same is connected receives liquid displaced by said power unit.

8. An apparatus for increasing the tractive effort of a locomotive having a power operated driver wheel and having a trailer wheel, said apparatus comprising a motor unit adapted to be operated by liquid for driving said trailer wheel, a power unit operative by said driver wheel to effect a positive displacement of liquid, means for conveying the liquid displaced by said power unit to said motor unit for operating said motor unit, and means responsive to the speed of rotation of said driver wheel for controlling said power unit and operative below a certain speed of rotation to render said power unit operative to displace liquid and above said certain speed inoperative to displace liquid.

9. An apparatus for increasing the tractive effort of a locomotive having a power operated driver wheel and having a trailer wheel, said apparatus comprising a motor unit adapted to be operated by liquid for driving said trailer wheel, a power unit operative by said driver wheel to effect a positive displacement of liquid, means for conveying the liquid displaced by said power unit to said motor unit for operating said motor unit, and means responsive to the speed of rotation of said trailer wheel for controlling the operation of said motor unit and operative above a chosen speed of rotation to render said motor unit inoperative by liquid displaced by said power unit and below said predetermined speed to render said motor unit operative by liquid displaced by said power unit.

10. An apparatus for increasing the tractive effort of a locomotive having a power operated driver wheel and having a trailer wheel, said apparatus comprising a motor unit adapted to be operated by liquid for driving said trailer wheel, a power unit operative by said driver wheel to effect a positive displacement of liquid, means for conveying the liquid displaced by said power unit to said motor unit for operating said motor unit, and means responsive to the speed of rotation of said wheels for controlling the operation of said units and operative above a chosen speed of rotation to render both of said units inoperative and below said chosen speed operative.

11. An apparatus for increasing the tractive effort of a locomotive having a power operated driver wheel and having a trailer wheel, said apparatus comprising a power unit associated with said driver wheel and operative upon rotation thereof to generate power proportional to the speed of rotation of said driver wheel, a motor unit associated with said trailer wheel and adapted to be operated by power generated by said power unit to turn said trailer wheel, means for regulating the power delivered from said power unit to said motor unit for operating said motor unit to an amount in direct proportion to the relative diameters of said driver and trailer wheels to provide the same peripheral speeds of both wheels, and means controlled by the speed of rotation of one of said wheels for rendering the associated unit inoperative above a predetermined degree of speed and operative below said predetermined degree of speed.

12. A locomotive booster comprising a fluid displacement device connected to a driver wheel of the locomotive and operative thereby to displace liquid to an outlet passage, a motor device having an inlet passage communicating with said outlet passage and adapted to be operated by liquid supplied by said displacement device to said inlet passage for driving a trailer wheel of the locomotive, both said displacement device and motor device comprising a stator, a rotor in said stator connected to rotate with the respective wheel, a movable element in said rotor and an element in said stator, said elements in said displacement device cooperating upon rotation of the rotor therein to displace liquid to said outlet passage and in said motor device said elements being subject to liquid supplied to said inlet passage to turn said trailer wheel, and centrifuge means in one of said devices connected to one of said elements therein and subject to action of centrifugal force upon rotation of the rotor therein and operable when the speed of rotation of the rotor exceeds a chosen degree to actuate said one element to render the one device nonoperating to thus cut said booster out of operation.

13. A locomotive booster comprising a fluid displacement device connected to a driver wheel of the locomotive and operative thereby to displace liquid to an outlet passage, a motor device having an inlet passage communicating with said outlet passage and adapted to be operated by liquid supplied by said displacement device to said inlet passage for driving a trailer wheel of the locomotive, both said displacement device and motor device comprising a stator, a rotor in said stator connected to rotate with the respective wheel and cooperating with said stator to provide an annular chamber around said rotor, a movable element carried by said stator and extending through said chamber and having substantial sliding contact with said rotor, a movable element in said rotor extending through said chamber and having substantial sliding contact with said stator, said elements in said displacement device being cooperative upon rotation of the rotor therein to displace liquid through said outlet passage to said inlet passage and said elements in said motor device being subject to the liquid displaced to said inlet passage for operating the rotor element to turn the trailer wheel, and timing means in both devices operable in synchronism with the rotation of the rotor and the relative location of said elements to move one of said elements out of said chamber to provide for movement of the rotor element past the stator element.

14. A locomotive booster comprising a fluid displacement device connected to a driver wheel of the locomotive and operative thereby to displace liquid to an outlet passage, a motor device having an inlet passage communicating with said outlet passage and adapted to be operated by liquid supplied by said displacement device to said inlet passage for driving a trailer wheel of the locomotive, both said displacement device and motor device comprising a stator, a rotor in said stator connected to rotate with the respective wheel and cooperating with said stator to provide an annular chamber around said rotor, a movable element carried by said stator and extending through said chamber and having substantial sliding contact with said rotor, a movable element in said rotor extending through said chamber and having substantial sliding contact with said stator, said elements in said displacement device being cooperative upon rotation of the rotor therein to displace liquid through said outlet passage to said inlet passage and said elements in said motor device being subject to the liquid displaced to said inlet passage for operating the rotor element to turn the trailer wheel, timing means in both devices operable in synchronism with the rotation of the rotor and the relative location of said elements to move one of said elements out of said chamber to provide for movement of the rotor element past the stator element, and centrifuge means in one of said devices connected to one of said elements therein and subject to action of centrifugal force which varies according to the speed of the rotor in the device and operable when the rotor speed is greater than a chosen degree to move the connected element out of said chamber for thereby cutting said booster out of operation.

15. A locomotive booster comprising a fluid displacement device connected to a driver wheel of the locomotive and operative thereby to displace liquid to an outlet passage, a motor device having an inlet passage communicating with said outlet passage and adapted to be operated by liquid supplied by said displacement device to said inlet passage for driving a trailer wheel of the locomotive, both said displacement device and motor device comprising a stator, a rotor in said stator connected to rotate with the respective wheel and cooperating with said stator to provide an annular chamber around said rotor, an element in said stator extending through said chamber and having substantial sliding contact with said rotor, an element carried by said rotor and movable from a non-working position within the rotor contour out of said rotor through said chamber to a working position in substantial sliding contact with said stator, spring means for urging said rotor element to said working position, cam means operative in synchronism with rotation of said rotor and the relative disposition of said elements to move said rotor element to its nonworking position for movement past said stator element, said elements in said displacement device cooperating upon rotation of said rotor to displace liquid to said outlet passage and thence to said inlet passage, and said elements in said motor device being subject to the liquid supplied said inlet passage for actuating the rotor element to turn said trailer wheel, and means in one of said devices associated with the rotor thereof and subject to action of centrifugal force upon rotation of the rotor to move the rotor element to said non-working position when the speed of the rotor exceeds a predetermined degree for thereby cutting the booster out of operation.

16. A locomotive booster comprising a fluid displacement device connected to a driver wheel of the locomotive and operative thereby to displace liquid to an outlet passage, a motor device having an inlet passage communicating with said outlet passage and adapted to be operated by liquid supplied by said displacement device to said inlet passage for driving a trailer wheel of the locomotive, both said displacement device and motor device comprising a stator, a rotor in said stator connected to rotate with the respective wheel and cooperative with said stator to provide an annular space around said rotor which is filled with liquid, a blade slidably mounted in said stator and extending through said space into sliding contact with said rotor, the stator in said displacement device having a communication connecting the back of said blade therein to said outlet passage, and the stator in said motor device having a communication connecting the back of the blade therein to said inlet passage for thereby subjecting said blades to the pressure of liquid displaced by said displacement device to urge said blades into contact with the respective rotors, each of said devices further comprising an element in the rotor movable from a non-working position within the contour of the rotor to a working position in contact with the stator, means for urging said element to said working position, the said blade and element in said displacement device cooperating upon rotation of the rotor to displace liquid from the space therein to said outlet passage, the space in said motor device between the blade and the trailing side of the rotor element being open to said inlet passage whereby said rotor element in said motor device is subject to pressure in said inlet passage for turning said rotor in said motor device and thereby said trailer wheel, and means in each device operative upon rotation of the rotor therein to effect movement of the rotor element to said non-working position for movement past said blade.

17. A locomotive booster comprising a fluid displacement device connected to a driver wheel of the locomotive and operative thereby to displace liquid to an outlet passage, a motor device having an inlet passage communicating with said outlet passage and adapted to be operated by liquid supplied by said displacement device to said inlet passage for driving a trailer wheel of the locomotive, both said displacement device and motor device comprising a stator, a rotor in said stator connected to rotate with the respective wheel and cooperative with said stator to provide an annular space around said rotor which is filled with liquid, a blade slidably mounted in said stator and extending through said space into sliding contact with said rotor, the stator in said displacement device having a communication connecting the back of said blade therein to said outlet passage, and the stator in said motor device having a communication connecting the back of the blade therein to said inlet passage for thereby subjecting said blades to the pressure of liquid displaced by said displacement device to urge said blades into contact with the respective rotors, each of said devices further comprising an element in the rotor movable from a non-working position within the contour of the rotor to a working position in contact with the stator, means for urging said element to said working position, the said blade and element in said displacement device cooperating upon rotation of the rotor to displace liquid from the space therein to said outlet passage, the space in said motor device between the blade and the trailing side of the rotor element being open to said inlet passage whereby said rotor element in said motor device is subject to pressure in said inlet passage for turning said rotor in said motor device and thereby said trailer wheel, and means in each device operative upon rotation of the rotor therein to effect movement of the rotor element to said non-working position for movement past said blade, and other means in each device controlled by the speed of rotation of the rotor and operative by centrifugal force when the rotor speed exceeds a chosen degree to hold the rotor element in said non-working position.

18. A locomotive booster comprising a fluid displacement device connected to a driver wheel of the locomotive and operative thereby to displace liquid, and a motor device associated with a trailer wheel of the locomotive and adapted to be operated by said displaced liquid to turn said trailer wheel, each of said devices comprising a rotor secured to rotate with the respective wheel, a stator encircling the rotor, a blade slidably mounted in said stator and adapted to slidably contact the rotor, an element in said rotor adapted to slidably engage said stator, said blade and element in the displacement device being cooperative upon rotation of the rotor during forward movement of the locomotive to displace liquid to one outlet passage and during rearward movement to displace liquid to another outlet passage, the first named outlet passage being connected to space in said motor device between the blade and rotor element therein at the trailing side of the rotor element upon forward movement of the locomotive for operating the motor rotor to turn the trailer wheel in a forward direction and the second named outlet passage being connected to space in the motor device at the opposite side of said rotor element for operating said trailer wheel in the reverse direction upon rearward movement of the locomotive, the space to the rear of the blade in both of said devices being adapted to communicate with either one or the other of said outlet passages, and valve means controlling such communication and operative by liquid displaced to either one or the other of said outlet passages to close communication to the other outlet passage for thereby subjecting the back of said blades to the pressure of liquid displaced by said displacement device in both directions of movement of the locomotive for urging the blades into contact with the rotors.

BURTON S. AIKMAN.